(12) United States Patent
Suzuki

(10) Patent No.: US 12,379,321 B2
(45) Date of Patent: Aug. 5, 2025

(54) SULFUR CHEMILUMINESCENCE DETECTOR

(71) Applicant: SHIMADZU CORPORATION, Kyoto (JP)

(72) Inventor: Takamasa Suzuki, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 223 days.

(21) Appl. No.: 17/293,734

(22) PCT Filed: Dec. 12, 2018

(86) PCT No.: PCT/JP2018/045623
§ 371 (c)(1),
(2) Date: May 13, 2021

(87) PCT Pub. No.: WO2020/121426
PCT Pub. Date: Jun. 18, 2020

(65) Prior Publication Data
US 2022/0011237 A1    Jan. 13, 2022

(51) Int. Cl.
*G01N 21/76* (2006.01)
*B01D 53/02* (2006.01)
(Continued)

(52) U.S. Cl.
CPC ......... *G01N 21/766* (2013.01); *B01D 53/025* (2013.01); *G01N 30/06* (2013.01); *G01N 30/74* (2013.01)

(58) Field of Classification Search
CPC ...... G01N 21/766; G01N 30/06; G01N 30/74; B01D 53/025
(Continued)

(56) References Cited

U.S. PATENT DOCUMENTS 1,984,933 A * 12/1934 Kuenhold ............. F24H 9/2085
237/53
2,000,119 A *  5/1935 Harrison .............. G01N 27/185
236/15 E
(Continued)

FOREIGN PATENT DOCUMENTS

CN      201173899 Y  * 12/2008
JP      57110961 A   *  7/1982
(Continued)

OTHER PUBLICATIONS

Shi, H. et al., Journal of Chromatography A 1997, 779, 307-313 (Year: 1997).*
(Continued)

*Primary Examiner* — Arlen Soderquist
(74) *Attorney, Agent, or Firm* — Sughrue Mion, PLLC

(57) ABSTRACT

A sulfur chemiluminescence detector includes a heating furnace 210 that includes a gas passage 211 which is a passage extending to left and right, in which an end portion on an outlet side of a column 140 of a gas chromatogram is inserted into an end portion on an inlet side, and a heating means 215 for heating the gas passage, a reaction cell 231 configured to cause gas that has passed through the gas passage to react with ozone, a photodetector 233 configured to detect light emitted from the reaction cell, a housing 240 that houses the heating furnace, the reaction cell, and the photodetector, and an interface 250 that is attached to penetrate a wall of the housing and provided with a column passage 251 through which the column 140 is inserted and a heating means 252 for heating the column passage 251. In the sulfur chemiluminescence detector, the housing is configured to be able to hold the heating furnace in either a state in which the end portion on the inlet side of the gas passage is directed to right or a state in which the end portion on the inlet side is directed to left, and is configured to allow the (Continued)

interface to be attached to either a right wall 242 or a left wall 243. In this manner, the sulfur chemiluminescence detector can be applied to GC systems having various configurations.

3 Claims, 5 Drawing Sheets

(51) Int. Cl.
    *G01N 30/06*     (2006.01)
    *G01N 30/74*     (2006.01)

(58) Field of Classification Search
    USPC .................. 436/119–121, 172; 422/52, 78
    See application file for complete search history.

(56) References Cited

U.S. PATENT DOCUMENTS

| | | | |
|---|---|---|---|
| 2,060,599 A * | 11/1936 | Van Seggern | F24H 1/32 |
| | | | 122/210 |
| 2,147,606 A | 2/1939 | McMillan et al. | |
| 3,399,038 A * | 8/1968 | Jacques | G01N 27/4162 |
| | | | 422/90 |
| 3,403,545 A | 10/1968 | Carter | |
| 3,527,567 A * | 9/1970 | O'Neal, Jr. | G01N 30/30 |
| | | | 436/139 |
| 3,698,869 A | 10/1972 | Condon | |
| 3,703,355 A * | 11/1972 | Yoshihiro | G01N 31/12 |
| | | | 436/116 |
| 3,749,929 A | 7/1973 | Wooten et al. | |
| 3,819,499 A * | 6/1974 | Hoogeveen | G01N 33/1806 |
| | | | 422/79 |
| 3,848,128 A | 11/1974 | McMillan, Jr. | |
| 3,861,874 A * | 1/1975 | Krc | G01N 31/12 |
| | | | 436/60 |
| 3,877,875 A * | 4/1975 | Jones | G01N 31/005 |
| | | | 436/109 |
| 3,898,041 A * | 8/1975 | Stephens | G01N 1/4022 |
| | | | 422/78 |
| 3,904,371 A | 9/1975 | Neti et al. | |
| 4,018,562 A * | 4/1977 | Parks | G01N 21/766 |
| | | | 422/52 |
| 4,044,593 A | 8/1977 | Haruki et al. | |
| 4,054,414 A * | 10/1977 | Grob | G01N 31/12 |
| | | | 436/115 |
| 4,066,409 A | 1/1978 | Fine | |
| 4,066,411 A * | 1/1978 | Fine | G01N 30/84 |
| | | | 436/118 |
| 4,070,155 A * | 1/1978 | Fraim | G01N 31/005 |
| | | | 436/114 |
| 4,087,249 A * | 5/1978 | Okumoto | G01N 31/12 |
| | | | 422/78 |
| 4,118,193 A | 10/1978 | Neti et al. | |
| 4,193,963 A | 3/1980 | Bruening et al. | |
| 4,227,887 A * | 10/1980 | Takahashi | G01N 33/1826 |
| | | | 436/154 |
| 4,244,917 A * | 1/1981 | Woods | G01N 31/12 |
| | | | 432/198 |
| 4,301,114 A * | 11/1981 | Rounbehler | B01D 53/02 |
| | | | 436/118 |
| 4,333,735 A | 6/1982 | Hardy et al. | |
| 4,409,336 A * | 10/1983 | Oita | G01N 31/12 |
| | | | 205/785.5 |
| 4,569,918 A * | 2/1986 | Moore | G01N 27/06 |
| | | | 436/178 |
| 4,587,835 A | 5/1986 | Adams | |
| 4,599,218 A | 7/1986 | Demaison et al. | |
| 4,710,354 A * | 12/1987 | Behar | G01N 1/4022 |
| | | | 422/78 |
| 4,778,764 A * | 10/1988 | Fine | G01N 31/12 |
| | | | 422/89 |
| 4,843,016 A * | 6/1989 | Fine | G01N 31/12 |
| | | | 436/116 |
| 4,851,683 A | 7/1989 | Yang et al. | |
| 4,916,077 A * | 4/1990 | Forster | G01N 31/12 |
| | | | 261/78.2 |
| 4,916,313 A | 4/1990 | Hall et al. | |
| 4,950,456 A * | 8/1990 | Forster | G01N 31/12 |
| | | | 261/78.2 |
| 4,970,905 A * | 11/1990 | McClennen | G01N 30/10 |
| | | | 73/864.34 |
| 4,985,925 A | 1/1991 | Langberg et al. | |
| 5,009,591 A * | 4/1991 | Watanabe | G01N 30/12 |
| | | | 432/128 |
| 5,012,052 A * | 4/1991 | Hayes | G01N 30/84 |
| | | | 250/288 |
| 5,242,471 A | 9/1993 | Markham et al. | |
| 5,271,894 A * | 12/1993 | Kozakura | G01N 21/766 |
| | | | 422/86 |
| 5,298,225 A * | 3/1994 | Higdon | G01N 30/88 |
| | | | 422/89 |
| 5,352,611 A | 10/1994 | Fine et al. | |
| 5,470,754 A | 11/1995 | Rounbehler et al. | |
| 5,501,981 A * | 3/1996 | Ray | G01N 30/68 |
| | | | 436/119 |
| 5,614,417 A | 3/1997 | Kubala | |
| 5,766,954 A * | 6/1998 | Freedman | G01N 33/2835 |
| | | | 436/158 |
| 5,783,741 A * | 7/1998 | Ellis | G01N 30/84 |
| | | | 422/89 |
| 5,916,523 A * | 6/1999 | Yan | G01N 21/766 |
| | | | 422/52 |
| 5,980,832 A * | 11/1999 | Andresen | G01N 31/005 |
| | | | 422/89 |
| 6,057,162 A * | 5/2000 | Rounbehler | G01N 33/497 |
| | | | 436/119 |
| 6,096,267 A | 8/2000 | Kishkovich et al. | |
| 6,207,460 B1 | 3/2001 | Kishkovich et al. | |
| 6,245,298 B1 * | 6/2001 | Bremer | G01N 30/12 |
| | | | 422/68.1 |
| 6,442,995 B1 | 9/2002 | Van Der Maas | |
| 6,458,328 B1 * | 10/2002 | Wreyford | G01N 31/12 |
| | | | 422/89 |
| 6,511,850 B1 | 1/2003 | Vigh et al. | |
| 6,530,260 B1 | 3/2003 | Mustacich et al. | |
| 8,378,293 B1 | 2/2013 | Quimby et al. | |
| 2002/0090735 A1 | 7/2002 | Kishkovich et al. | |
| 2003/0015019 A1 | 1/2003 | O'Brien | |
| 2003/0049854 A1* | 3/2003 | Rhodes | G01N 33/0014 |
| | | | 422/62 |
| 2003/0049855 A1* | 3/2003 | Rhodes | G01N 33/0014 |
| | | | 436/117 |
| 2003/0082822 A1 | 5/2003 | Lanier et al. | |
| 2004/0126729 A1* | 7/2004 | Hayashi | G01N 31/12 |
| | | | 432/66 |
| 2004/0151630 A1 | 8/2004 | Hernandez, Jr. et al. | |
| 2005/0074365 A1 | 4/2005 | Olstowski | |
| 2005/0129578 A1 | 6/2005 | Olstowski | |
| 2005/0153253 A1* | 7/2005 | Olstowski | F23M 9/06 |
| | | | 431/76 |
| 2006/0245973 A1 | 11/2006 | Kita et al. | |
| 2006/0246594 A1 | 11/2006 | Appel et al. | |
| 2007/0181798 A1 | 8/2007 | Lubkowitz et al. | |
| 2008/0156072 A1* | 7/2008 | Smeets | G01N 31/12 |
| | | | 436/160 |
| 2008/0299670 A1* | 12/2008 | Smeets | F23C 3/00 |
| | | | 422/83 |
| 2008/0302959 A1 | 12/2008 | Amirav | |
| 2009/0249860 A1 | 10/2009 | Tanikawa | |
| 2009/0272270 A1 | 11/2009 | Mcgill et al. | |
| 2010/0101304 A1* | 4/2010 | McIntyre | G01N 30/84 |
| | | | 73/23.37 |
| 2010/0118301 A1 | 5/2010 | Vondras et al. | |
| 2010/0212398 A1* | 8/2010 | Krummen | G01N 31/12 |
| | | | 250/288 |
| 2011/0146378 A1 | 6/2011 | Brand et al. | |
| 2012/0258857 A1* | 10/2012 | Pham | B01J 35/04 |
| | | | 502/328 |

(56) References Cited

U.S. PATENT DOCUMENTS

| | | | |
|---|---|---|---|
| 2014/0017129 A1* | 1/2014 | Miki ................ | G01N 33/0013 |
| | | | 423/242.1 |
| 2014/0219868 A1* | 8/2014 | Sasaki ................ | G01N 30/84 |
| | | | 422/54 |
| 2016/0097747 A1 | 4/2016 | Narukami | |
| 2017/0137285 A1* | 5/2017 | Ide ........................ | B01J 23/10 |
| 2019/0383748 A1* | 12/2019 | Barendregt .......... | G01N 21/766 |
| 2020/0003695 A1 | 1/2020 | Horiike et al. | |
| 2020/0249170 A1* | 8/2020 | Yamane ................ | G01N 21/76 |
| 2021/0285886 A1* | 9/2021 | Barendregt .......... | G01N 21/766 |
| 2021/0404999 A1* | 12/2021 | Kozakura .............. | G01N 21/76 |
| 2022/0011237 A1 | 1/2022 | Suzuki | |
| 2022/0026370 A1* | 1/2022 | Suzuki ................ | G01N 33/0073 |
| 2022/0026406 A1* | 1/2022 | Li ........................ | B01D 53/025 |

FOREIGN PATENT DOCUMENTS

| | | | |
|---|---|---|---|
| JP | 60-10170 A | 1/1985 | |
| JP | 2015059876 A * | 3/2015 | ........... G01N 21/766 |
| JP | 7207422 B2 | 1/2023 | |
| WO | 01/46683 A2 | 6/2001 | |
| WO | 2015/083794 A1 | 6/2015 | |
| WO | 2018/139920 A1 | 8/2018 | |
| WO | 2018/168599 A1 | 9/2018 | |
| WO | 2020/110408 A1 | 6/2020 | |
| WO | 2020/121426 A1 | 6/2020 | |

OTHER PUBLICATIONS

Agilent 355 Sulfur and 255 Nitrogen Chemiluminescence Detectors Operation and Mantainance Manual 2012, 120 pages. (Year: 2012).*

Agilent 8355 S Sulfur and 8255 S Nitrogen Chemiluminescence Detectors User Manual 2017, 110 pages. (Year: 2017).*

"Sulfur chemical emission detector Simple instruction manual", Agilent Technologies, 2007, retrieved from the internet: <URL:https://www.chem-agilent.com/cimg/SCD.pdf> (26 pages).

Notice of Allowance dated Feb. 1, 2022 issued by the Japanese Patent Office in Japanese Application No. 2020-559595.

International Search Report of PCT/JP2018/045623 dated Mar. 5, 2019 [PCT/ISA/210].

Written Opinion of PCT/JP2018/045623 dated Mar. 5, 2019 [PCT/ISA/237].

Office Action dated May 10, 2022 issued by the Japanese Patent in Japanese Application No. English 2020-559681.

International Search Report for PCT/JP2019/002999, dated Mar. 19, 2019.

Agilent Technologies, Inc., "Agilent 8355 Chemiluminescent Sulfur Detector/ Agilent 8255 Chemiluminescent Nitrogen Detector" User Manual [Online], 3rd Edition, Dec. 2015, pp. 35-60, [Search Date Feb. 25, 2019] Internet: <URL:https://www.agilent.com/cs/library/userrnanuals/public/Copy(4)%20of%20UserManual.pdf>.

Written Opinion for PCT/JP2019/002999, dated Mar. 19, 2019.

Chinese Office Action dated Jan. 2, 2024 in Chinese Application No. 201880099712.X.

Office Action dated Oct. 27, 2023 issued in Chinese Application No. 201980081588.9.

United States Office Action issued Feb. 28, 2024 in U.S. Appl. No. 17/298,301.

Communication dated Jun. 12, 2024, issued in Chinese Application No. 201980081588.9.

Office Action issued Sep. 14, 2023 in U.S. Appl. No. 17/298,301.

Office Action issued Nov. 14, 2024 in Chinese Patent Application No. 201980081588.9.

Office Action issued Sep. 27, 2024 in Chinese Application No. 201880099712.X.

Final Office Action dated Oct. 17, 2024, issued in U.S. Appl. No. 17/298,301.

\* cited by examiner

SULFUR CHEMILUMINESCENCE DETECTOR

CROSS REFERENCE TO RELATED APPLICATIONS

This application is a National Stage of International Application No. PCT/JP2018/045623, filed Dec. 12, 2018.

TECHNICAL FIELD

The present invention relates to a sulfur chemiluminescence detector.

BACKGROUND ART

A sulfur chemiluminescence detector (SCD) is a detector that can detect a sulfur compound in a sample with high sensitivity by using chemiluminescence, and is usually used in combination with a gas chromatograph (GC) (for example, Patent Literature 1).

Gas (sample gas) containing a sample component separated by a column of the GC is introduced into a heating furnace provided in the SCD. In the heating furnace, sulfur monoxide (SO) is produced from a sulfur compound in the sample gas by a redox reaction at high temperature. This SO is introduced into a reaction cell in the SCD and mixed with ozone ($O_3$) in the reaction cell. The reaction between SO and ozone produces an excited species of sulfur dioxide ($SO_2^*$). The emission intensity when this $SO_2^*$ returns to the ground state through chemiluminescence is detected by a photodetector, and the sulfur compound contained in the sample gas is quantified from the emission intensity.

CITATION LIST

Patent Literature

Patent Literature 1: JP 2015-59876 A

SUMMARY OF INVENTION

Technical Problem

Among detectors for GC, relatively small ones such as a flame ionization detector (FID) and a thermal conductivity detector (TCD) are attached to the top of a GC for use. However, the SCD, which is relatively large, is installed next to a GC and used. Next to the GC, however, other relatively large detectors (for example, a mass spectrometer) and sample pretreatment devices (for example, a headspace sampler) may be arranged. In a case where these devices are used in combination with the SCD, their arrangement is restricted.

For example, a mass spectrometer (MS) is generally arranged on the left side of the GC, and thus when this is used in combination with the SCD, the SCD needs to be arranged on the right side of the GC (note that in the present description, left or right refers to one's side facing the front of the GC). Further, the sample pretreatment device is generally arranged on the right side of the GC, so that, when it is used in combination with the SCD, the SCD needs to be arranged on the left side of the GC.

In view of the above, it is conceivable that, for example, a manufacturer prepares two models of the SCDs: one that can be arranged on the right side of the GC and another that can be arranged on the left side of the GC. SCD of the model that corresponds to the configuration of a GC system (specifically, that corresponds to a type of a device to be used in combination with the SCD) desired by the user is delivered to the user. However, in this case, the manufacturer needs to manufacture the SCD of a right placement model and the SCD of a left placement model separately, which causes a problem that the manufacturing cost increases.

The present invention has been developed in view of the above points, and an object of the present invention is to provide an SCD applicable to a GC system having various configurations with one device.

Solution to Problem

The sulfur chemiluminescence detector (SCD) according to the present invention developed to solve the above problems is a sulfur chemiluminescence detector, including:

a heating furnace that includes a gas passage which is a passage extending to left and right, in which an end portion on an outlet side of a column of a gas chromatogram is inserted into an end portion on an inlet side of the passage, and a first heating means for heating the gas passage;

a reaction cell configured to cause gas that has passed through the gas passage of the heating furnace to react with ozone;

a photodetector configured to detect light emitted from the reaction cell;

a housing that has at least a right wall and a left wall and houses the heating furnace, the reaction cell, and the photodetector; and an interface provided with a column passage through which the column is inserted and a second heating means for heating the column passage, wherein the housing is configured to be able to hold the heating furnace in either a state in which the end portion on the inlet side of the gas passage is directed to right or a state in which the end portion on the inlet side is directed to left, and is configured to allow the interface to be attached to either the right wall or the left wall.

It is preferable in the sulfur chemiluminescence detector according to the present invention, the housing has a first opening coaxially provided with the gas passage of the heating furnace on the right wall and a second opening coaxially provided with the gas passage on the left wall, and the interface is configured to be able to be inserted through both the first opening and the second opening.

Further, it is preferable in the sulfur chemiluminescence detector according to the present invention, the interface is selected from the group including two types of interfaces having different lengths from each other.

Advantageous Effects of Invention

The sulfur chemiluminescence detector (SCD) according to the present invention having the above configuration can take two types of states: a state in which the end portion on the inlet side of the gas passage of the heating furnace is directed to the right and the interface is arranged on the right wall of the housing; and a state in which the end portion on the inlet side is directed to the left and the interface is arranged on the left side of the housing. For this reason, the SCD according to the present invention can be arranged either on the right side or on the left side of the gas chromatograph, and one SCD can be applied to GC systems having various configurations.

DESCRIPTION OF EMBODIMENTS

Figure 1:
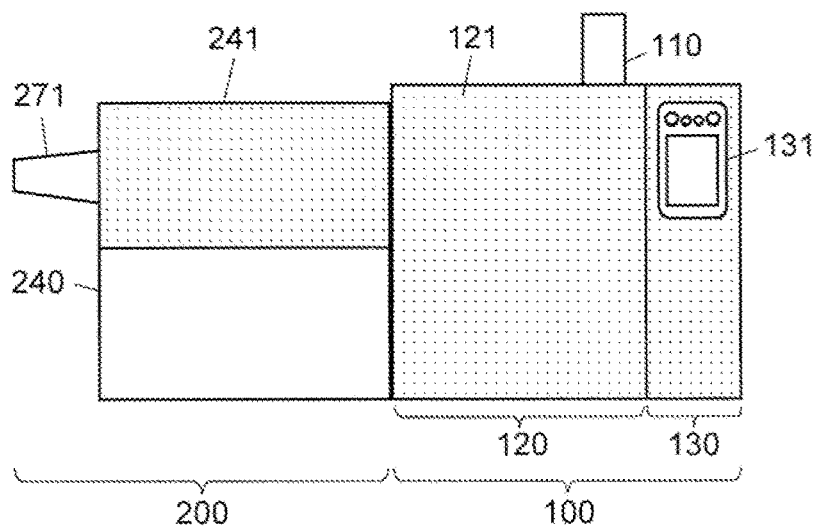
FIG. 1 is a front view illustrating an appearance of a GC system including an SCD according to an embodiment of the present invention.
Figure 2:
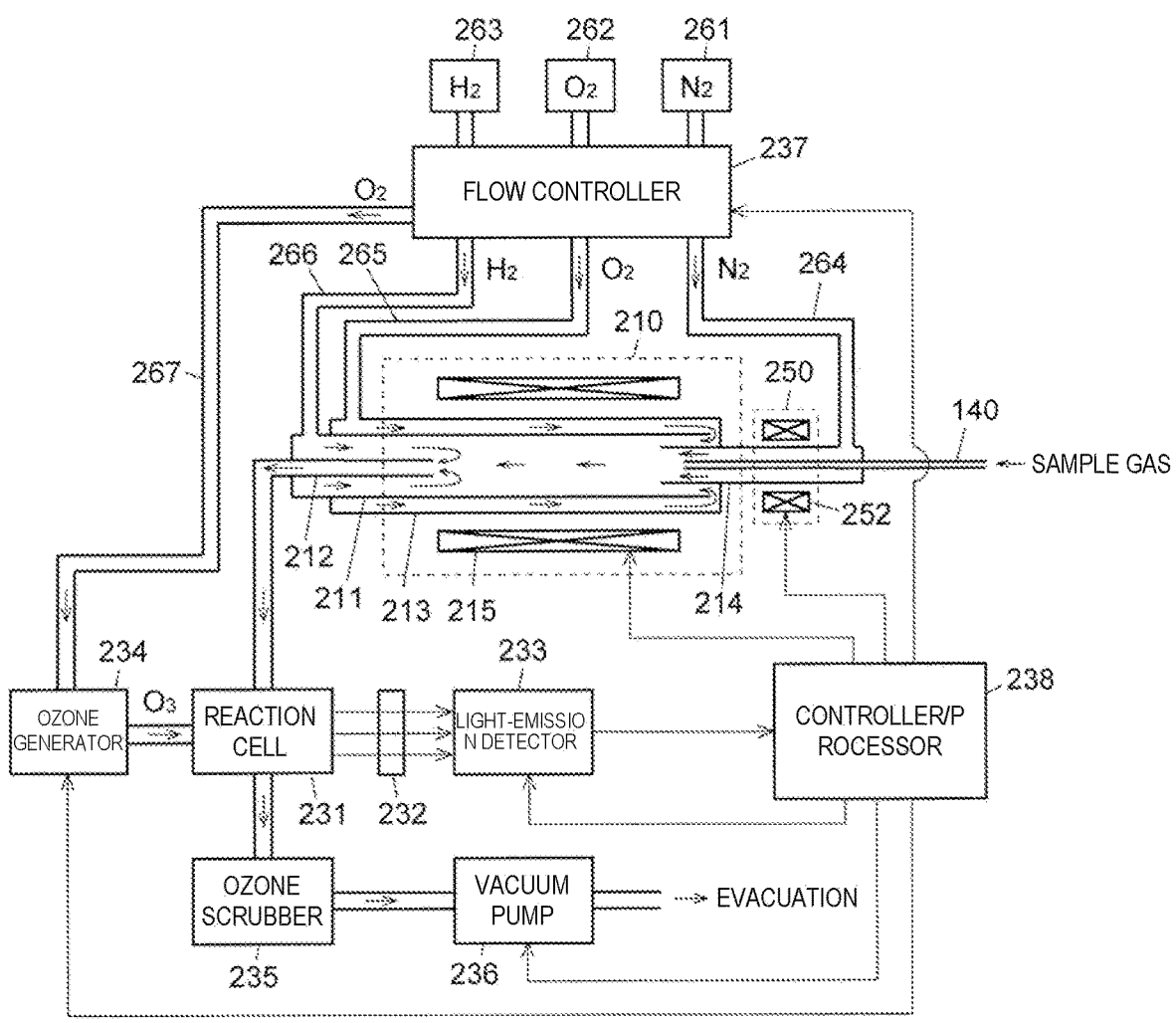
FIG. 2 is a diagram illustrating a configuration of a main part of the SCD.
Figure 3:
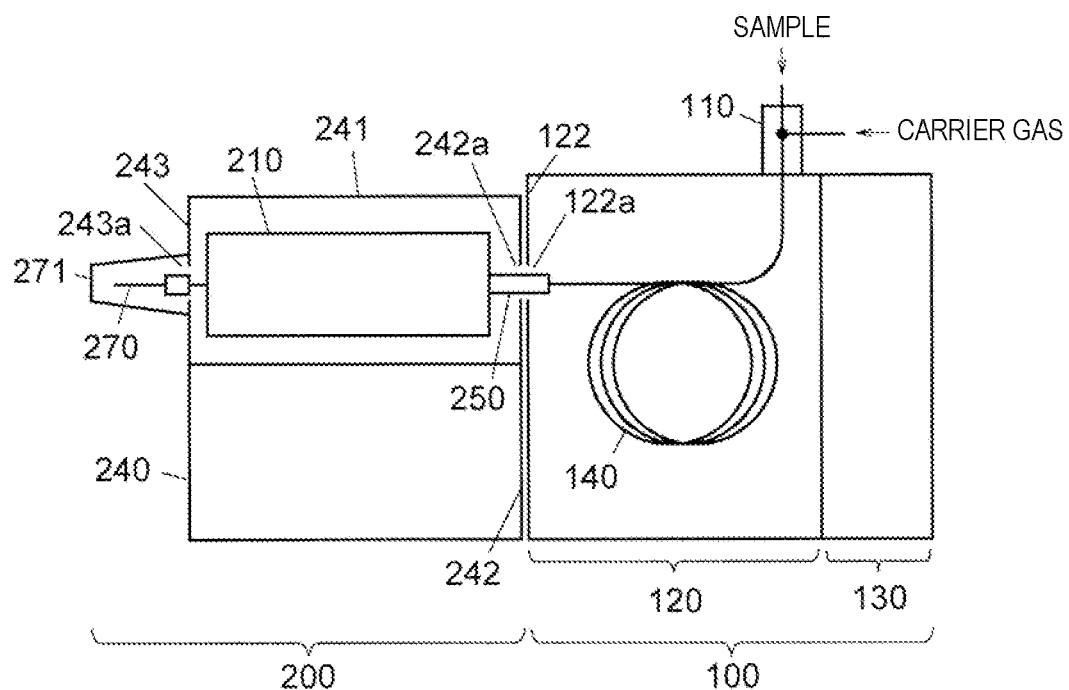
FIG. 3 is a front view schematically illustrating an internal configurations of the GC and the SCD in a case where the SCD is arranged to the left of the GC.
Figure 4:
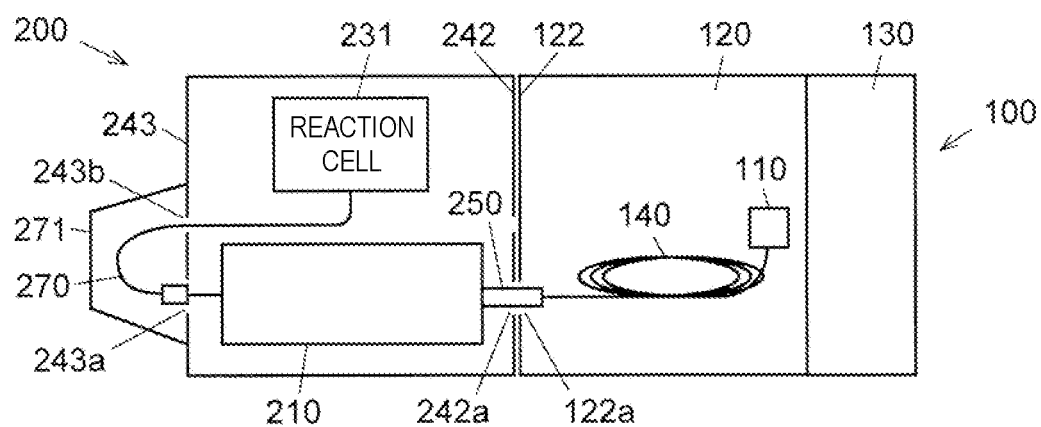
FIG. 4 is a top view schematically illustrating the internal configurations of the GC and the SCD in a case where the SCD is arranged to the left of the GC.
Figure 5:
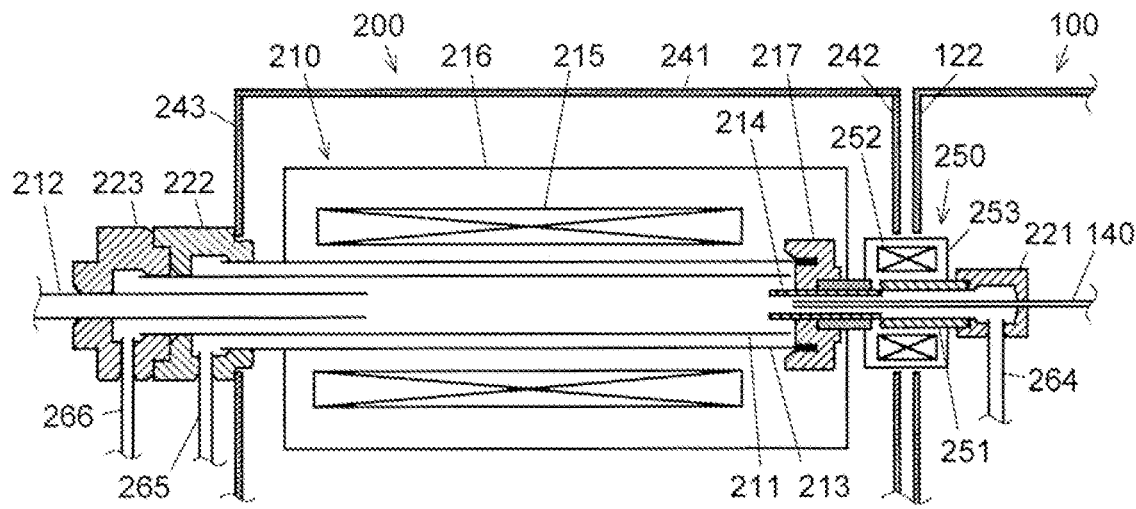
FIG. 5 is a cross-sectional view illustrating a configuration near a heating furnace of the SCD in a case where the SCD is arranged to the left of the GC.

Hereinafter, a configuration for carrying out the present invention will be described with reference to the drawings. FIG. 1 is a front view illustrating an appearance of a gas chromatograph system (GC system) including a sulfur chemiluminescence detector (SCD) according to the present embodiment. FIG. 2 is a diagram illustrating a schematic configuration of the SCD according to the present embodiment. FIGS. 3 and 4 are schematic diagrams illustrating an internal structure of the GC system, and FIG. 3 is a front view, and FIG. 4 is a top view. FIG. 5 is a cross-sectional view illustrating a configuration near a heating furnace of the SCD.

Although FIGS. 1, 3, 4, and 5 show a state in which an SCD 200 is arranged on the left side of a gas chromatograph (GC) 100, the SCD 200 according to the present embodiment can also be arranged on the right side of the GC 100 as will be described later.

The GC 100 includes a sample introduction unit 110, a column oven 120 that houses and heats a column 140, and a control-board container 130 that houses a control-board (not shown) and the like. The front part of the column oven 120 is a door 121 that can be opened and closed, and an operation panel 131 is provided on the front surface of the control-board container 130.

In the GC 100, a sample is introduced into flow of carrier gas at the sample introduction unit 110, and the carrier gas containing the sample is introduced into an inlet end of the column 140 housed in the column oven 120. The sample is separated for each component in the process of passing through the column 140, and gas containing each separated sample component (hereinafter referred to as "sample gas") is sequentially eluted from an outlet end of the column 140.

As shown in FIG. 2, the SCD 200 includes a heating furnace 210, a reaction cell 231, an optical filter 232, a light-emission detector 233, an ozone generator 234, an ozone scrubber 235, a vacuum pump 236, a flow controller 237, and a controller/processor 238, and a housing 240 (see FIG. 1) that houses them. Furthermore, the SCD 200 includes an interface 250 that is arranged at the boundary with the GC 100 for connecting the GC 100 and the SCD 200.

As shown in FIGS. 3 and 4, in the SCD 200, the heating furnace 210 is housed on the upper front side of the housing 240 of the SCD 200, and the reaction cell 231 and other constituents (not shown in FIGS. 3 and 4) are housed in the remaining space inside the housing 240 (for example, below or behind the heating furnace 210). Of the housing 240 of the SCD 200, the top of the space in which the heating furnace 210 is housed is a removable top plate 241 (see FIG. 1).

The heating furnace 210 includes an exterior combustion tube 211 (corresponding to a "gas passage" in the present invention), an interior combustion tube 212, an oxidizing-agent supply tube 213, an inert-gas introduction tube 214, a heater 215 (corresponding to a "first heating means" in the present invention), and a housing 216 that houses them. The exterior combustion tube 211 is arranged inside the oxidizing-agent supply tube 213 coaxially with the oxidizing-agent supply tube 213, and one end (left end) of the inert-gas introduction tube 214 is inserted into the right end of the exterior combustion tube 211. Further, one end (right end) of the interior combustion tube 212 is inserted into the left end of the exterior combustion tube 211. The exterior combustion tube 211, the interior combustion tube 212, the oxidizing-agent supply tube 213, and the inert-gas introduction tube 214 are all made from ceramic such as alumina.

A connector 217 is attached to the right end of the oxidizing-agent supply tube 213 and the exterior combustion tube 211, and the inert-gas introduction tube 214 is inserted through the connector 217. Although a right end opening of the oxidizing-agent supply tube 213 and the exterior combustion tube 211 is closed by the connector 217, a groove is provided on the left end surface of the connector 217, and gas can flow between the oxidizing-agent supply tube 213 and the exterior combustion tube 211 through the groove. The right end of the inert-gas introduction tube 214 protrudes from the housing 216 of the heating furnace 210, and is connected to the left end of a tube 251 (corresponding to a "column passage" in the present invention) provided inside the interface 250 arranged at the boundary between the GC 100 and the SCD 200. The interface 250 includes, in addition to the tube 251, a heater 252 (corresponding to a "second heating means" in the present invention) for heating the tube 251 and a housing 253 that houses the tube 251 and the heater 252, and is inserted through an opening 242a (corresponding to a "first opening" in the present invention) provided on a right wall 242 of the housing 240 of the SCD 200 and an opening 122a provided on a left wall 122 of the housing of the GC 100. The right end of the tube 251 protrudes from the housing 253 of the interface 250, and a first joint 221 is attached to the right end. An inert-gas passage 264 for supplying inert gas (here, nitrogen) to the inert-gas introduction tube 214 is connected to the first joint 221. The first joint 221 is provided with a hole (not shown) for inserting the column 140 of the GC 100. An end portion on the outlet side of the column 140 is inserted through this hole into the first joint 221, and passes through the tube 251 in the interface 250 to the inside of the heating furnace 210, specifically, to the position slightly closer to the right side than the left end of the inert-gas introduction tube 214 in the inside of the inert-gas introduction tube 214.

The left ends of the oxidizing-agent supply tube 213, the exterior combustion tube 211, and the interior combustion tube 212 protrude from the housing 216 of the heating furnace 210, and protrude further to the outside from an opening 243a (corresponding to a "second opening" in the present invention) provided on a left wall 243 of the housing 240 of the SCD 200. Outside the housing 240, a second joint 222 is attached to the left end of the oxidizing-agent supply tube 213, and an oxidizing-agent passage 265 for supplying an oxidant (here, oxygen) to the oxidizing-agent supply tube 213 is connected to the second joint 222. The exterior combustion tube 211 is inserted through the second joint 222, and a third joint 223 is attached to the left end of the exterior combustion tube 211. A reducing-agent passage 266 for supplying a reducing agent (here, hydrogen) to the exterior combustion tube 211 is connected to the third joint 223. The interior combustion tube 212 is inserted through the third joint 223, and the left end of the interior combustion tube 212 is connected to a transportation tube 270 leading to the reaction cell 231.

The transportation tube 270 is composed of a flexible tube, is folded back outside the housing 240 of the SCD 200, enters the inside of the housing 240 again from another opening 243b (see FIG. 4) provided on the left wall 243 of the housing 240, and is connected to the reaction cell 231 in the housing 240. Although not shown in FIG. 5, a cover 271 that can be opened and closed is provided at a position that covers the openings 243a and 243b on the outer surface of the left wall 243 of the SCD 200.

The inert-gas passage 264, the oxidizing-agent passage 265, and the reducing-agent passage 266 are all connected to the flow controller 237. The flow controller 237 controls a flow rate of gas supplied from an inert-gas supply source 261, an oxidizing-agent supply source 262, and a reducing-agent supply source 263 to the inert-gas passage 264, the oxidizing-agent passage 265, and the reducing-agent passage 266, respectively. The inert-gas supply source 261, the oxidizing-agent supply source 262, and the reducing-agent supply source 263 can be composed of, for example, a gas cylinder and the like filled with nitrogen, oxygen, and hydrogen, respectively.

Nitrogen supplied from the inert-gas supply source 261 to the inert-gas passage 264 via the flow controller 237 flows into the right end of the inert-gas introduction tube 214 via the first joint 221 and the tube 251 and progresses to the left through the inside of the inert-gas introduction tube 214.

Oxygen supplied from the oxidizing-agent supply source 262 to the oxidizing-agent passage 265 via the flow controller 237 flows into the left end of the oxidizing-agent supply tube 213 via the second joint 222, and progresses to the right in the space between an inner wall of the oxidizing-agent supply tube 213 and an outer wall of the exterior combustion tube 211. Oxygen that reaches the right end of the oxidizing-agent supply tube 213 flows into the inside of the exterior combustion tube 211 from the groove (described above) formed on the left end surface of the connector 217, and progresses to the left in the exterior combustion tube 211.

Hydrogen supplied from the reducing-agent supply source 263 to the reducing-agent passage 266 via the flow controller 237 flows into the left end of the exterior combustion tube 211 via the third joint 223, and progresses to the right in the space between an inner wall of the exterior combustion tube 211 and an outer wall of the interior combustion tube 212. Hydrogen that reaches the vicinity of the right end of the interior combustion tube 212 is drawn into the interior combustion tube 212 from there, and progresses to the left inside the interior combustion tube 212.

The sample gas introduced into the heating furnace 210 from the outlet end of the column 140 of the GC 100 is mixed with oxygen at the right end of the exterior combustion tube 211, and is oxidatively decomposed at a high temperature while progressing to the left inside the exterior combustion tube 211.

At this time, in a case where the sample component is a sulfur compound, sulfur dioxide is produced. The gas containing the oxidatively decomposed sample component is drawn into the interior combustion tube 212 together with hydrogen introduced from the vicinity of the left end of the exterior combustion tube 211. In a case where sulfur dioxide is contained in the oxidatively decomposed sample component, sulfur dioxide reacts with hydrogen here and is reduced to sulfur monoxide. The gas that has passed through the interior combustion tube 212 is introduced into the reaction cell 231 through the transportation tube 270.

Nitrogen is supplied from the inert-gas introduction tube 214 to around the outlet end of the column 140. This nitrogen has an effect of preventing detector contamination due to deterioration of the column 140 and an effect of promoting a redox reaction in the heating furnace 210.

In order to promote the redox reaction inside the exterior combustion tube 211 and the interior combustion tube 212, the heater 215 heats the inside of the heating furnace 210 to 500° C. or higher (preferably 700° C. to 1200° C.) in the hottest region.

The gas sent from the transportation tube 270 to the reaction cell 231 is mixed with ozone in the reaction cell 231. At this time, the chemiluminescence generated by the reaction between sulfur monoxide and ozone is detected by the light-emission detector 233 composed of a photomultiplier tube or the like via the optical filter 232. The ozone is generated in the ozone generator 234 using oxygen supplied from the oxidizing-agent supply source 262 via an oxygen passage 267, and is supplied to the reaction cell 231. At this time, the flow rate of oxygen supplied to the ozone generator 234 via the oxygen passage 267 is also controlled by the flow controller 237. The ozone scrubber 235 and the vacuum pump 236 are provided downstream of the reaction cell 231. Gas in the reaction cell 231 sucked by the vacuum pump 236 is discharged to the outside as exhaust after ozone is removed by the ozone scrubber 235.

A detection signal from the light-emission detector 233 is sent to the controller/processor 238, and the controller/processor 238 obtains the concentration of the sulfur compound in the sample gas based on the detection signal. The controller/processor 238 can be realized by, for example, a microcomputer including a CPU, a ROM, a RAM, and an input/output circuit for communicating with an external peripheral device or the like, and executes, for example, a control program stored in the ROM and arithmetic processing according to a control parameter mainly on the CPU, so as to perform processing of the detection signal and operation control of units, specifically, the heater 215 of the heating furnace 210, the heater 252 of the interface 250, the light-emission detector 233, the ozone generator 234, the vacuum pump 236, the flow controller 237, and the like.

Figure 6:
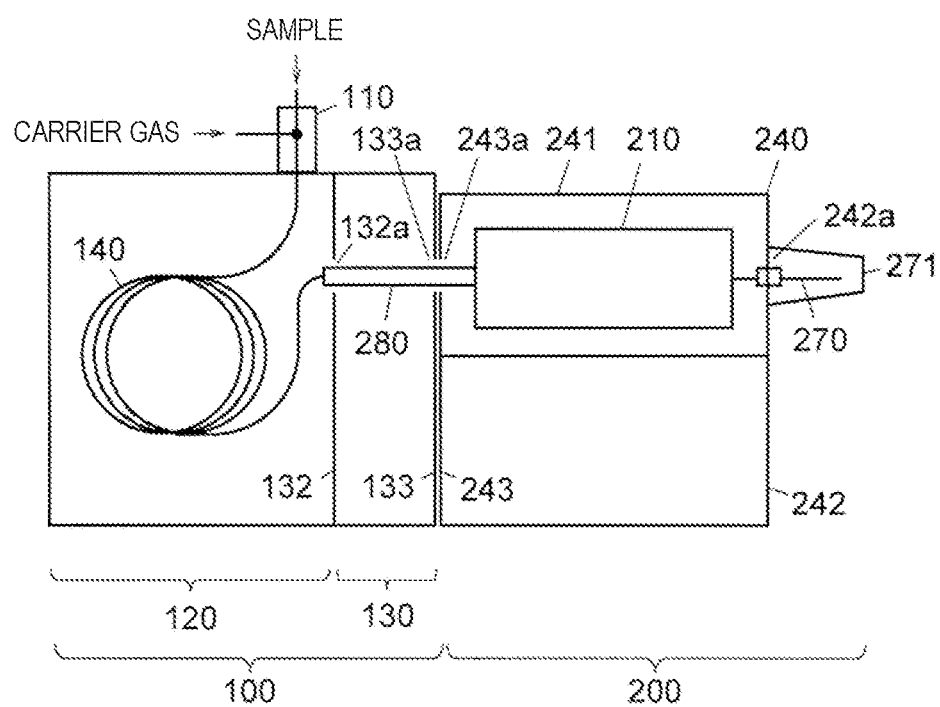
FIG. 6 is a front view schematically illustrating an internal configurations of the GC and the SCD in a case where the SCD is arranged to the right of the GC.
Figure 7:
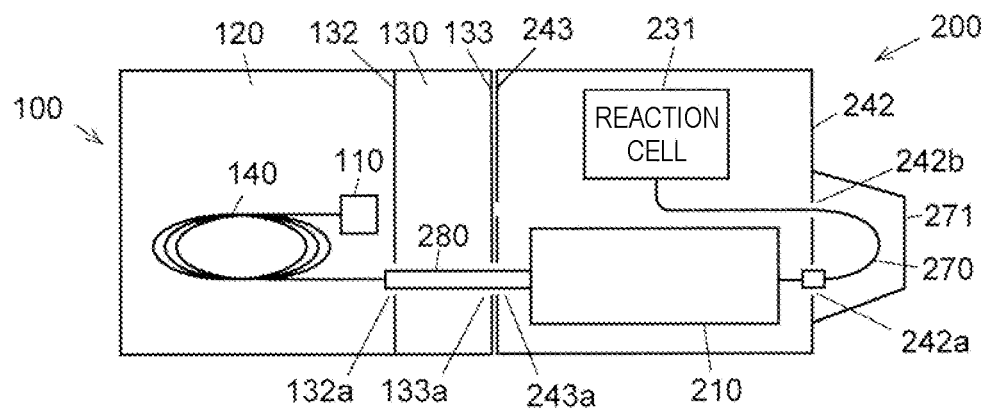
FIG. 7 is a top view schematically illustrating the internal configurations of the GC and the SCD in a case where the SCD is arranged to the right of the GC.

As described above, the removable top plate 241 is provided on the top of the housing 240 of the SCD 200. By removing the top plate 241, the heating furnace 210 can be taken out from the housing 240 or the heating furnace 210 can be attached the housing 240. In the above description, the heating furnace 210 is used with its end portion on the inlet side (that is, an end portion on the side where the column 140 is inserted) facing the right. However, the housing 240 of the SCD 200 according to the present embodiment has a configuration, in which the heating furnace 210 can be held with its end portion on the inlet side facing the right or the left. In this manner, the SCD 200 according to the present embodiment can be used by being arranged on the left side of the GC 100 as shown in FIGS. 1 and 3 to 5 (hereinafter, this is referred to as "left placement"), and can also be used by being arranged on the right side of the GC 100 (hereinafter referred to as "right placement") as shown in FIGS. 6 to 8.

When the SCD 200 according to the present embodiment is placed on the right, it is necessary to pull an end portion on the outlet side of the column 140 into the SCD 200 through the control-board container 130 provided on the right side of the column oven 120 of the GC 100. Therefore, in this case, it is necessary to use, instead of the interface 250 (hereinafter referred to as "interface for left placement") used for left placement, an interface 280 (hereinafter referred to as "interface for right placement") longer than the interface 250. That is, in the SCD 200 according to the present embodiment, two types of models of the interfaces 250 and 280, one for left placement and the other for right placement, are prepared in advance, and an interface of a model corresponding to a usage mode (that is, right placement or left placement) desired by the user is selectively used. The interface 280 for right placement includes a tube 281, a heater 282, and a housing 283 like the interface 250 for left placement, and has an outer diameter equal to that of the interface 250 for left placement and a length longer than a width (dimension in the left-right direction) of the control-board container 130 of the GC 100.

Figure 8:
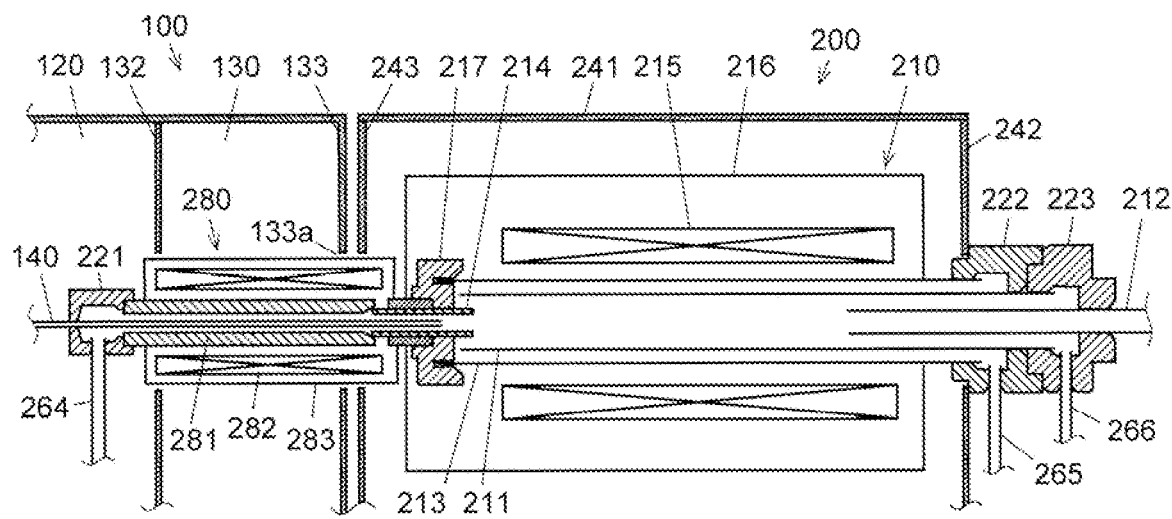
FIG. 8 is a cross-sectional view illustrating a configuration near the heating furnace of the SCD in a case where the SCD is arranged to the right of the GC.

When the SCD 200 is placed to the right, as shown in FIG. 8, openings 132a and 133a are formed on a partition wall 132 between the column oven 120 of the GC 100 and the control-board container 130 and a right wall 133 of the control-board container 130, respectively, and the interface 280 for right placement is inserted through the openings 132a and 133a. Furthermore, the interface 280 for right placement is inserted through the opening 243a of the left wall 243 of the housing 240 of the SCD 200, and end portions of the oxidizing-agent supply tube 213, the exterior combustion tube 211, and the interior combustion tube 212 protruding from the housing 216 of the heating furnace 210 are inserted through the opening 242a of the right wall 242 of the SCD 200. Outside the right wall 242 of the SCD 200, the second joint 222 and the third joint 223 are attached to the end portions of the oxidizing-agent supply tube 213 and the exterior combustion tube 211, respectively, and the transportation tube 270 leading to the reaction cell 231 is connected to the end portion of the interior combustion tube 212. Further, the cover 271 covering them is provided on the outer side of the right wall 242 of the SCD 200. Although reference numerals are omitted in FIG. 4, another opening 242b (see FIG. 7) is formed behind the opening 242a of the right wall 242 of the SCD 200, and when the SCD 200 is placed on the right, the transportation tube 270 is inserted through the another opening 242b.

In a case where the SCD 200 is placed on the left as shown in FIGS. 1 and 3 to 5, the SCD 200 can be used in combination with a device (for example, a pretreatment device) arranged on the right side of the GC 100. In contrast, in a case where the SCD 200 is placed on the right as shown in FIGS. 6 to 8, the SCD 200 can be used in combination with a device (for example, MS) arranged on the left side of the GC 100. In a case where the SCD 200 is used in combination with another GC detector (for example, MS), the outlet end of the column 140 of the GC 100 is branched into two ends by a branch tube or the like, and one end is connected to the SCD 200 and the other end is connected to the another GC detector.

Figure 9:
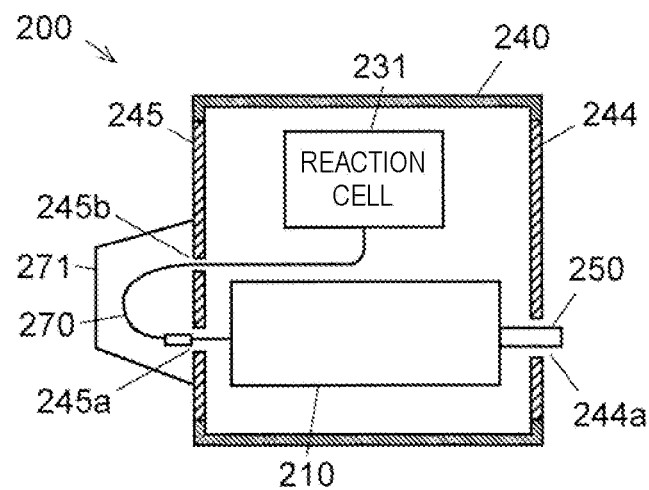
FIG. 9 is a top view illustrating a configuration in a case where the SCD including a removable side panel is placed on the left.
Figure 10:
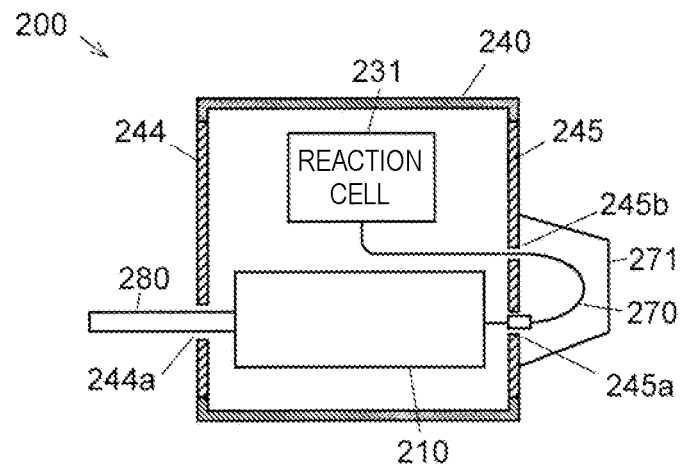
FIG. 10 is a top view illustrating a configuration in a case where the SCD including the removable side panel is placed on the right.

Although the embodiment for carrying out the present invention is described above with specific examples, the present invention is not limited to the above embodiment, and modifications are permitted as appropriate within the scope of the gist of the present invention. For example, in the above embodiment, the oxidizing-agent supply tube 213, the exterior combustion tube 211, and the interior combustion tube 212 (hereinafter collectively referred to as "oxidizing-agent supply tube, and the like"), or the interfaces 250 and 280 can be inserted through both the opening 242a provided on the right wall 242 and the opening 243a provided on the left wall 243 of the housing 240 of the SCD 200. However, instead of the above, the left and right walls may be composed of a removable side panel. The configuration in this case is shown in FIGS. 9 and 10. As the side panel, a first side panel 244 including an opening 244a through which the interfaces 250 and 280 can be inserted and a second side panel 245 including an opening 245a through which an oxidizing-agent supply tube and the like can be inserted (and an opening 245b through which the transportation tube 270 can be inserted) may be prepared, and these may be replaced as appropriate for use. In this case, in a case where the SCD 200 is placed on the left, as shown in FIG. 9, the first side panel 244 is attached to the right side of the housing 240 of the SCD 200, and the second side panel 245 is attached to the left side of the housing 240 of the SCD 200. Conversely, in a case where the SCD 200 is placed on the right, as shown in FIG. 10, the first side panel 244 is attached to the left side of the housing 240 of the SCD 200, and the second side panel 245 is attached the right side of the housing 240 of the SCD 200.

Further, in the above embodiment, oxygen is used as the oxidant. However, air can be used instead of oxygen. Further, although nitrogen is used as the inert gas in the above embodiment, other inert gas (for example, helium) can also be used. Further, since the supply of the inert gas is not essential for the operation of the SCD, the SCD according to the present invention can have a configuration that does not have the inert-gas supply source 261, the inert-gas passage 264, the inert-gas introduction tube 214, or the like.

REFERENCE SIGNS LIST

100 . . . GC
110 . . . Sample Introduction Unit
120 . . . Column Oven
130 . . . Control-Board Container
140 . . . Column
200 . . . SCD
210 . . . Heating Furnace
211 . . . Exterior Combustion Tube
212 . . . Interior Combustion Tube
213 . . . Oxidizing-Agent Supply Tube
214 . . . Inert-Gas Introduction Tube
215 . . . Heater
216 . . . Housing
231 . . . Reaction Cell
232 . . . Optical Filter
233 . . . Light-Emission Detector
234 . . . Ozone Generator
235 . . . Ozone Scrubber 236 . . . Vacuum Pump
237 . . . Flow Controller
238 . . . Controller/Processor
240 . . . Housing
242 . . . Right Wall
242a . . . Opening
243 . . . Left Wall
243a . . . Opening
250, 280 . . . Interface
270 . . . Transportation Tube
251, 281 . . . Tube
252, 282 . . . Heater
253, 283 . . . Housing
244 . . . First Side Panel
245 . . . Second Side Panel

The invention claimed is:

1. A sulfur chemiluminescence detector, comprising:
a gas passage extending in a horizontal direction a first end of which is configured for insertion of an outlet of a column of a gas chromatograph;
a heating furnace including the gas passage and a first heating means for heating the gas passage;
a reaction cell connectable to a second end of the gas passage and configured to react gas having passed through the gas passage with ozone;
a photodetector configured to detect light emitted from the reaction cell;
a housing which houses the heating furnace, the reaction cell and the photodetector;
a connector provided with an inert-gas introduction tube, the inert-gas introduction tube being fluidly coupled to the gas passage; and
a selectable interface including a first interface and a second interface, the first interface and the second interface each having a column passage and a second heating means,
wherein a length of the column passage and the second heating means in the first interface is shorter than that in the second interface,
wherein when the first interface is selected, the first interface is inserted into a first opening provided in a first wall of the gas chromatograph and the column is inserted into the first opening and the column passage,
wherein when the second interface is selected, the second interface is inserted into a second opening provided in a second wall facing the first wall of the gas chromatograph and the column is inserted into the second opening and the column passage, and
wherein the inert-gas introduction tube is fluidly coupled to the column passage of either the first interface or the second interface.

2. The sulfur chemiluminescence detector according to claim 1, wherein
the housing has openings coaxially provided with the gas passage.

3. The sulfur chemiluminescence detector according to claim 1, wherein the column passage has a length adapted to a distance to the gas chromatograph.

* * * * *